United States Patent [19]
Mason

[11] 3,711,947
[45] Jan. 23, 1973

[54] SHEARABLE PROTECTIVE MOLDING AND SHEAR

[75] Inventor: John R. Mason, Los Angeles, Calif.
[73] Assignee: Dracon Industries, Chatsworth, Calif.
[22] Filed: April 2, 1971
[21] Appl. No.: 130,633

[52] U.S. Cl. .................................. 30/179, 83/581
[51] Int. Cl. ........................................... B26b 17/00
[58] Field of Search ............ 30/178, 179, 233; 83/581

[56] References Cited

UNITED STATES PATENTS

| | | | |
|---|---|---|---|
| 414,225 | 11/1889 | Knight | 83/581 |
| 413,522 | 10/1889 | Kelsey | 83/581 X |
| 1,082,385 | 12/1913 | Zimmerman | 30/233 |
| 1,082,629 | 12/1913 | Hadaway | 83/581 |
| 3,280,684 | 10/1966 | Bremer | 83/581 X |

Primary Examiner—Robert C. Riordon
Assistant Examiner—J. C. Peters
Attorney—Allan M. Shapiro

[57] ABSTRACT

Molding of uniform cross section so that it is economically extrudable, and is formed of flexible thermoplastic synthetic polymer composition material. Molding includes pressure sensitive adhesive tape on its under surface for attachment to side of automobile vehicle to receive small blows which could otherwise chip the paint.

The molding end is conveniently beveled by means of a shear having a support surface and an end stop to receive and position the molding, with a cutter blade moving angularly to the support surface to bevel the end of the molding.

3 Claims, 5 Drawing Figures

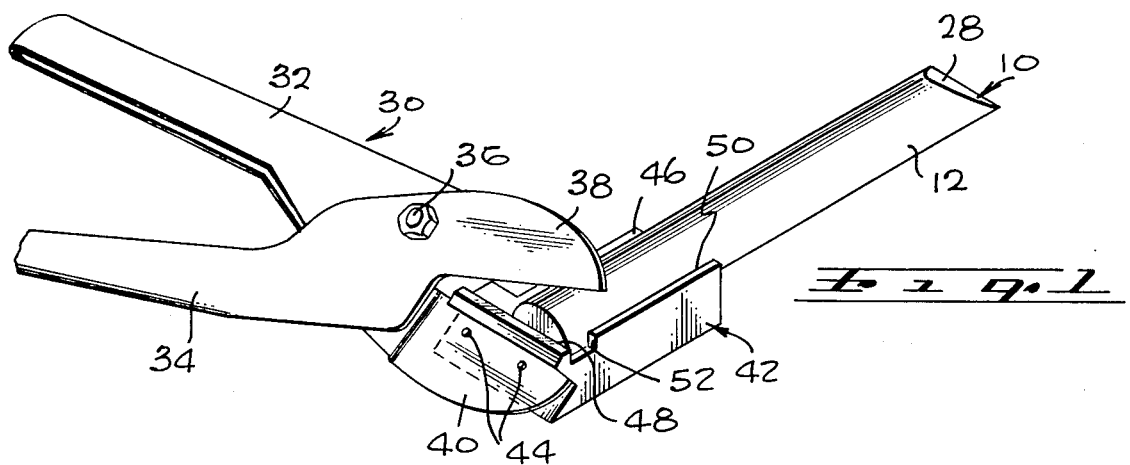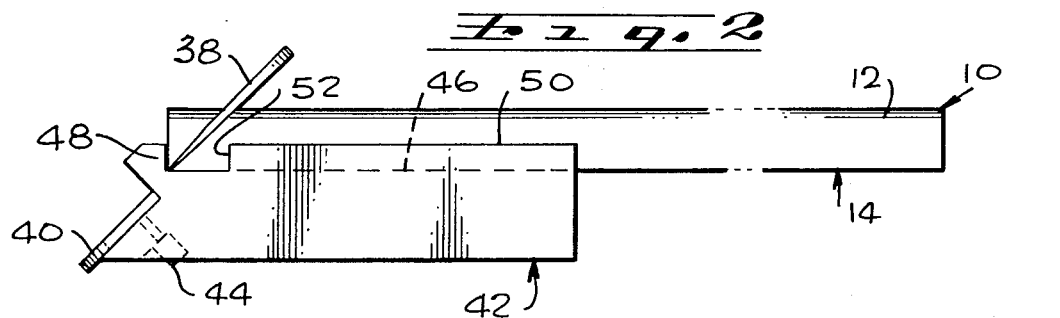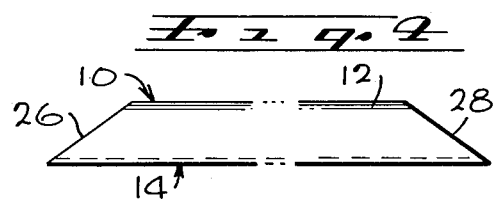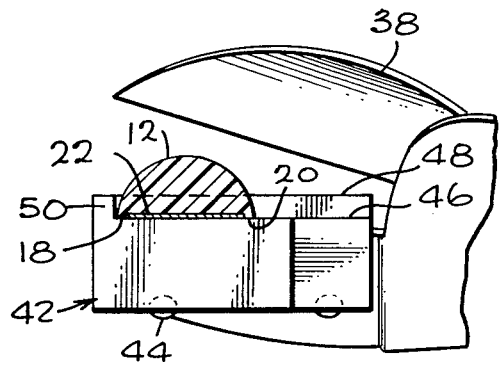

SHEARABLE PROTECTIVE MOLDING AND SHEAR

BACKGROUND OF THE INVENTION

1. Field of the Invention

This invention is directed to a shearable protective molding for attachment to the exterior sides of automotive vehicles to protect them against damage caused by small blows, and to the shear for angularly chamferring the molding ends.

2. Description of the Prior Art

Automotive moldings are well known. Most automotive moldings are principally of ornamental character, but some of them have functional characteristics which protect the sides of automotive vehicles from paint chipping damage. When they are purely ornamental, the positioning of such moldings is strictly determined by appearance. When such moldings are employed for both ornamental and functional characteristics, some care is taken to apply them where they are functionally useful. However, all of the well-known prior art moldings are principally employed for their ornamental character. Thus, they are made of metal, often bent into convex shape and chrome-plated for maximum ornamental appearance. Such moldings are secured by molding clips fastened to the vehicle sides. These molding clips must be prepositioned and secured before a molding can be attached. Positioning must be accurate, or the appearance is impaired. Thus, the prior art moldings are unsuited for convenient later attachment to automotive vehicles but, instead, find their principal application in factory attachment as ornamental devices.

BRIEF SUMMARY OF THE INVENTION

In order to aid in the understanding of this invention, it can be stated in essentially summary form that it is directed to a shearable protective molding. The molding is of extrudable, flexible thermoplastic synthetic polymer composition material and has a uniform cross section. The cross section carries a longitudinal recess on the otherwise flat bottom surface which is to be directed toward the side of the vehicle. Pressure-sensitive adhesive tape is positioned in the recess so that it extends only slightly out of the recess.

The invention also includes a shear specifically useful for the bevel end cutting of the shearable protective molding. The shear has a support surface and a stop, against which the molding rests, and a pivotable cutter blade which angularly moves with respect to the support surface to angularly cut the end of the molding positioned against the support surface and the stop.

Accordingly, it is an object of this invention to provide a shearable protective molding which can be quickly and easily installed on the outside of an automotive vehicle to protect the vehicle against minor damage, such as paint chipping. It is a further object to provide a shearable protective molding which has beveled ends to enhance appearance thereof when it is installed on the side of an automotive vehicle. It is still another object to provide a molding which is inexpensively produced as an extrusion of thermoplastic synthetic polymer composition material. It is a further object to provide a shearable protective molding having a recess in the bottom surface which is to lie against the side of the automotive vehicle, with a double-sided, pressure-sensitive tape in the recess extending only slightly beyond the recess so that the tape is protected and the molding fits tightly against the side of the automotive vehicle.

It is another object to provide a shear for bevel-shearing the ends of such a protective molding. It is still another object to provide a shear which has a support surface and a stop, with a cutter blade angularly moving with respect to the support surface so that, when the protective molding is positioned against the support surfaces and the stop, the cutter blade cuts the end at an angle.

Still other objects, features, and attendant advantages of the present invention, together with various modifications, will become apparent to those skilled in the art from a reading of the following detailed description of the preferred embodiment constructed in accordance therewith, taken in conjunction with the accompanying drawings wherein like numerals designate like parts of the several figures.

BRIEF DESCRIPTION OF THE DRAWINGS

FIG. 1 is an isometric view of the shearable protective molding of this invention in place on the shear of this invention, for the bevel shearing of the end of the molding.

FIG. 2 is an enlarged, right side-elevational view thereof, showing the cut completed.

FIG. 3 is a view from the right end of FIG. 2 showing the cutting blade in the raised position.

FIG. 4 is a side elevational view showing a section of shearable protective molding with the ends angle-sheared.

FIG. 5 is an end elevational view of the molding of FIG. 4, and showing in dotted lines the removal of the protective backing strip on the adhesive.

DESCRIPTION OF THE PREFERRED EMBODIMENT

The shearable protective molding of this invention is shown in each of the figures and is generally indicated at 10. The body 12 of the molding 10 is of uniform cross section so that it can be conveniently and economically extruded. It is made of a thermoplastic synthetic polymer composition material for ease of extrusion and economic production. It is slightly flexible so that it can be gently bent along its length to fit the side contours found on automotive vehicles. For reference purposes, the side of the shearable protective molding which is intended to be engaged against an automotive vehicle is identified as the bottom, while the side of the molding facing in the same direction as the side of the automotive vehicle is identified as the top surface of the molding. The top surface is shown as being defined by a portion of the circumference of a circle, but any other convex form is convenient. However, this portion of a circle is the preferred embodiment.

The bottom surface of the molding is generally indicated at 14. It is defined by a line which is a chord of the circle and the chord may be a diameter, if desired. The plane thus defined by the chord line is interrupted on the bottom surface of the molding by a recess 16. The recess 16 is a rectangular recess which extends almost to the edges of the bottom surface, but the portion of the bottom surface in the form of strips 18 and 20 remain at the chord line adjacent the recess.

Inserted into recess 16 is a double-sided pressure-sensitive adhesive tape 22. The recess and the tape are dimensioned with respect to each other so that the width of the tape substantially fills the width of the recess, while the thickness of the tape is such that its lower pressure-sensitive adhesive surface extends sufficiently far out of the recess to permit the adhesive attachment of the molding 10. Until it is put into use, the lower pressure-sensitive adhesive surface on the tape 22 is protected by means of a protective backing strip 24, the removal of which is indicated in dotted lines in FIG. 5.

This protection of the pressure-sensitive adhesive tape 22 by having it in a recess provides inventory security by having the tape somewhat protected before use. In this recess, it is less likely to lose its protective strip by the ordinary handling as the molding goes into and out of inventory.

The ends of the molding 10 are preferably diagonally cut with chamfers 26 and 28, as illustrated in FIG. 4. This chamfering both increases security by making the ends less easily engageable accidentally and enhances appearance.

In application, to make sure that the molding goes on straight, a removable mark is marked along the side of the automotive vehicle on which the molding 10 is to be attached. The molding 10 is measured as to length, and the ends chamfered, as is shown in FIG. 4. Thereupon, the protective backing strip 24 is removed from the lower pressure-sensitive adhesive surface and the molding is attached to the side of the automotive vehicle, along the guideline, and is retained by the pressure-sensitive adhesive tape. As previously indicated, the depth of the recess, with respect to the thickness of the pressure-sensitive adhesive tape is such that the strips 18 and 20 substantially contact the side of the automotive vehicle to which it is attached. This makes for a structure without a gap between the molding and the side of the vehicle, wherein water seepage therebetween is minimized to enhance life. The small gap also reduces the opportunity for engagement under the molding, which might loosen the molding. With the molding 10 thus in position on the side of the automotive vehicle, the side of the vehicle is protected from damage caused by small blows, such as paint chipping which would otherwise occur when the door of an adjacent automotive vehicle is opened against the unprotected side of the vehicle.

In order to accomplish the chamfered ends on the shearable protective molding 10, which provides the enhanced appearance of the molding 10, and also reduces the chance of lifting of the end of the molding, shear 30 is provided. Most of the construction of shear 30 is conventional, and it has manually engageable and operable handles 32 and 34 which are pivoted with respect to each other on bolt 36. Sharp edged cutting blade 38 is formed on or is secured to the front end of handle 34. Anvil support 40 is formed on or secured to a forward end of handle 32. Anvil support 40 supports a novel anvil 42. Anvil 42 is secured to its support by means of rivets or screws 44, in conventional manner.

Anvil 42 has a large, planar support surface 46 for engagement of the bottom surface 14 of molding 10. Support surface 46 terminates in an end stop 48 and edge guide 50. The support surface 46, end stop 48, and edge guide 50 are conveniently mutually perpendicular to each other. This configuration permits the molding to engage all three surfaces for secure positioning while it is being cut. Surfaces 46 and 48 are arranged and positioned so that their juncture lies substantially in the plane of movement of the sharp cutting edge of cutting blade 38. As shown in FIG. 2, the cutting blade is moved down into this corner of the anvil and, in doing so, cuts a chamfered end on the molding 10. An opening 52 is provided in edge guide 50 to permit the passage of cutting blade 38 directly into the juncture of the end stop and support surfaces. During this cutting operation, the strips 18 and 20 securely engage against support surface 46 to prevent excessive pressure loading upon the pressure-sensitive adhesive, which might cause adhesive extrusion to reduce adhesive effectiveness where it is most needed, i.e., at the sheared end of the molding.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. A nipper for the cutting of cuttable protective molding, said nipper comprising:
   an anvil;
   a substantially planar support surface on said anvil for engagement by the substantially planar surface of a cuttable protective molding;
   an end stop surface formed along said support surface and extending above the plane thereof for engagement by the end of said molding;
   an edge guide surface formed along said support surface and extending above the plane thereof for engagement by the edge of said molding;
   said support surface, end stop surface and edge guide surface being integrally formed and mutually perpendicular; and
   a movable cutting blade movable in a plane which is positioned at an acute angle with respect to the plane of said support surface, with the plane of movement of said movable cutting blade substantially passing through the intersection of the plane of said support surface with said end stop surface, so that a protective molding is positioned while said cutting blade cuts the molding at said acute angle at the end of said molding.
2. The nipper of claim 1 wherein said edge guide surface has an opening therein adjacent said movable cutting blade to permit said movable cutting blade to pass.
3. The nipper of claim 2 wherein:
   said cutting blade is part of conventional nippers;
   said anvil is one-piece; and
   including fastener means for securement of said anvil to said nippers.

* * * * *